(12) United States Patent
Maxwell (10) Patent No.: US 8,976,220 B2
(45) Date of Patent: Mar. 10, 2015

(54) DEVICES AND METHODS FOR HOSTING A VIDEO CALL BETWEEN A PLURALITY OF ENDPOINTS

(71) Applicant: Sorenson Communications, Inc., Salt Lake City, UT (US)

(72) Inventor: Conrad Arlo Maxwell, Herriman, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 109 days.

(21) Appl. No.: 13/936,051

(22) Filed: Jul. 5, 2013

(65) Prior Publication Data

US 2015/0009276 A1    Jan. 8, 2015

(51) Int. Cl.
*H04N 7/14* (2006.01)

(52) U.S. Cl.
USPC ............. 348/14.07; 348/14.08; 375/240.03; 375/240.09; 375/240.16; 379/201.01; 709/226; 725/95

(58) Field of Classification Search
CPC ............ H04L 29/06027; H04L 65/1043; H04L 12/6418; H04N 21/00; H04N 7/148
USPC ........ 348/14.08; 375/240.03, 240.09, 240.16; 379/201.01; 709/226; 725/95
See application file for complete search history.

(56) References Cited

U.S. PATENT DOCUMENTS

| | | | |
|---|---|---|---|
| 5,508,745 A | 4/1996 | Jo | |
| 6,757,259 B1 | 6/2004 | Hamilton | |
| 6,922,718 B2 | 7/2005 | Chang | |
| 7,139,015 B2 | 11/2006 | Eshkoli et al. | |
| 7,321,384 B1 | 1/2008 | Wu et al. | |
| 7,349,000 B2 * | 3/2008 | McDonald et al. | 715/719 |
| 7,404,001 B2 | 7/2008 | Campbell et al. | |
| 7,701,930 B2 | 4/2010 | Dasgupta et al. | |
| 7,924,305 B2 | 4/2011 | Thielman et al. | |
| 8,254,444 B2 * | 8/2012 | Chappalli | 375/240.09 |
| 8,289,363 B2 * | 10/2012 | Buckler | 348/14.08 |
| 8,351,509 B1 * | 1/2013 | Hurd et al. | 375/240.16 |
| 8,390,669 B2 * | 3/2013 | Catchpole et al. | 348/14.08 |
| 8,477,173 B2 * | 7/2013 | Kenoyer et al. | 348/14.08 |
| 8,514,933 B2 * | 8/2013 | Liang et al. | 375/240.03 |
| 8,547,415 B2 * | 10/2013 | Edet | 348/14.08 |

(Continued)

OTHER PUBLICATIONS

Klomp et al., Decoder-side Hierarchical Motion Estimation for Dense Vector Fields, 28th Picture Coding Symposium, PCS2010, Dec. 8-10, 2010, pp. 362-365, Nagoya, Japan.

(Continued)

*Primary Examiner* — Gerald Gauthier
(74) *Attorney, Agent, or Firm* — TraskBritt (57) ABSTRACT

A video call host module comprising a processor configured to decode video data corresponding to videos from endpoints and rank the videos based on motion indicators corresponding to each of the endpoints. The motion indicators are calculated from motion vectors corresponding to each of the videos. A predetermined number of highest-ranking videos are selected for display. A method of hosting a video call includes receiving encoded video data including motion vectors. Videos are ranked based on a motion indicator calculated from the motion vectors for each of the videos. Encoded video data is converted to decoded video data, and decoded video data corresponding to a predetermined number of the highest ranking videos is combined to create a single video.

25 Claims, 6 Drawing Sheets

(56) References Cited

U.S. PATENT DOCUMENTS

| | | | |
|---|---|---|---|
| 8,578,432 B2* | 11/2013 | Vasudevan et al. | 725/95 |
| 2009/0132487 A1* | 5/2009 | Lev | 707/3 |
| 2012/0219064 A1* | 8/2012 | Zheng et al. | 375/240.16 |
| 2012/0306993 A1 | 12/2012 | Sellers-Blais | |
| 2013/0042007 A1* | 2/2013 | Linton et al. | 709/226 |
| 2013/0188787 A1* | 7/2013 | Balasaygun, Mehmet | 379/201.01 |

OTHER PUBLICATIONS

Kamp et al., Decoder side Motion Vector Derivation for Inter Frame Video Coding, Image Processing, 2008. ICIP 2008. 15th IEEE International Conference.

* cited by examiner

DEVICES AND METHODS FOR HOSTING A VIDEO CALL BETWEEN A PLURALITY OF ENDPOINTS

FIELD

Embodiments of the present disclosure relate to devices and methods for hosting a video call between a plurality of endpoints. More particularly, the present disclosure relates to hosting video calls for the hearing impaired.

BACKGROUND

Video phone communication systems provide visual and audio communication between two or more users during a communication session. A video phone at a first location can transmit and receive audio and video signals to and from a video phone at a second location such that participants at the first location are perceived to be present or face-to-face with participants at a second location and vice versa.

Video phone communication systems span a variety of applications. One contemplated application of a video phone system includes facilitization of a communication session of a hearing-impaired user (e.g., deaf or hard of hearing), because many individuals with significant hearing loss are not able to communicate effectively over conventional telephone systems that rely upon voice communications. The hearing-impaired user may use a video phone during a communication session to relay his or her expressions over the video phone communication system. Such video phone communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS) that may provide an interpretive (i.e., translation) service by providing a hearing-capable translator who relays the expressions of the hearing-impaired caller to a hearing-capable user on the other end of the communication session in a conventional manner, such as through the use of a voice-based dialogue conveyed over a conventional voice phone. The hearing-capable translator may also translate the voice-based dialogue back to the hearing-impaired user into expressions (e.g., American Sign Language (ASL)).

Video phones are sometimes used to facilitate communication between more than two users. In such instances, a display of the video phone is conventionally divided into a plurality of segments, and each segments displays video received from a different video phone. Conventionally, once each of the plurality of segments is assigned to display video received from a different video phone, no more participants may be added to the conversation. The number of participating video phones in a video conversation has also conventionally been limited by heavy computational and data transmission bandwidth demands associated with encoding, transmitting, and decoding video data.

U.S. Pat. No. 7,701,930 to Dasgupta et al., the disclosure of which is incorporated herein by this reference in its entirety, describes automatically selecting a limited subset of participants of a video conference for display by using audio detectors to determine which participants spoke most recently. The remaining participants operate in a voice only mode, are not displayed, and computing power and network bandwidth are conserved by suppressing their video output.

BRIEF SUMMARY

Embodiments of the present disclosure include a video call host module, and methods of hosting a video call.

In some embodiments, the present disclosure comprises a video call host module including a transceiver configured to communicate with a plurality of endpoints through one or more networks. The video call host module also comprises a processor operably coupled to the transceiver. The processor is configured to include a decoder configured to convert encoded video data received by the transceiver from the plurality of endpoints to decoded video data, the encoded video data corresponding to a plurality of videos and comprising a plurality of motion vectors. The processor is also configured to include a selector configured to rank the plurality of videos responsive to a motion indicator calculated from the plurality of motion vectors for each of the plurality of videos, and select a predetermined number of highest ranking videos for display at the endpoints. In addition, the processor is configured to include a video mixer configured to utilize the decoded video data to generate a mixed video comprising the predetermined number of highest ranking videos.

In other embodiments, the present disclosure comprises a method of hosting a video call. The method comprises receiving encoded video data including a plurality of motion vectors and corresponding to a plurality of videos from a plurality of endpoints participating in a video call at a transceiver of a video call host module. The method also includes utilizing a processor of the video call host module to rank the plurality of videos responsive to a motion indicator calculated from the motion vectors for each of the plurality of videos, and to select a predetermined number of highest ranking videos of the plurality of videos for display. In addition, the method includes utilizing a decoder to decode at least the encoded video data that corresponds to the predetermined number of the plurality of videos. The method further includes utilizing an encoder to convert the mixed video data into encoded mixed video data. The method also includes sending the encoded mixed video data from the transceiver to the plurality of endpoints.

In other embodiments, the present disclosure comprises a video call host module including a control circuit. The control circuit is configured to decode video data corresponding to a plurality of videos from a plurality of endpoints. The control circuit is also configured to rank the plurality of videos responsive to a plurality of motion indicators, each of the plurality of motion indicators corresponding to one of the plurality of videos, and each of the plurality of motion indicators calculated from one or more motion vectors of the one of the plurality of videos. The control circuit is additionally configured to select a predetermined number of highest-ranking videos for display.

In still other embodiments, the present disclosure comprises a method of hosting a video call. The method includes ranking a plurality of videos generated at a plurality of endpoints participating in a video call with a control circuit responsive to a motion indicator calculated from motion vectors corresponding to each of the plurality of videos. The method also includes utilizing the control circuit to select a predetermined number of highest ranking videos of the plurality of videos. In addition, the method includes receiving encoded video data at a transceiver operably coupled to the control circuit. The encoded video data corresponds to at least the predetermined number of highest ranking videos. The method also includes decoding at least the encoded video data that corresponds to the predetermined number of highest ranking videos with the control circuit. The method further includes utilizing the control circuit to generate mixed video data corresponding to a mixed video comprising the predetermined number of the plurality of videos.

DETAILED DESCRIPTION

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include devices and methods for hosting a video call between a plurality of video communication endpoints in video communication systems. As discussed above, video communication systems span a variety of applications. Embodiments of the present disclosure are generally described herein with reference to a video communication system for use by hearing-impaired users. Such video communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS). It should be noted, however, that embodiments of the present disclosure may include any application or environment where video calls between a plurality of video communication endpoints are desirable. For example, it is contemplated that embodiments of the present disclosure may include hosting video calls including one or more hearing-capable participants.

The term "call" refers to a communication with a video communication endpoint (hereinafter referred to simply as "endpoint") that may be routed through a number of networks, such as, for example, a private network, the internet, a telephone system, and a VRS. The term "incoming call" refers to an incoming communication to an endpoint. The endpoint may also communicate audio and the video communication may also include audio.

The term "endpoint" refers to a specific compilation of hardware components, software components, or a combination thereof. The term "endpoint" may also refer to a software based endpoint that exists on a device configured to execute machine-readable commands, such as, for example a computer. As software, it should be understood that the same endpoint may exist on a first device while a user accesses the endpoint on the first device, and on a second device at a different time while the user accesses the endpoint on the second device.

The term "unencoded video" refers to a sequential series of frames, each frame including a plurality of pixels. By way of non-limiting example, an unencoded high-definition video may include a sequential series of frames, each frame including an array of pixels 1,920 pixels wide by 1,080 pixels high, and a frame rate of 60 frames per second. Assuming that each pixel in each frame may be represented by 24 bits of data (8 bits for each of red, green, and blue content of each pixel), a bandwidth needed to transmit, display, process, or store the unencoded video in real time would be about 2.99 gigabits per second (Gbps) (1,920 pixels wide×1,080 pixels high×24 bits per pixel×60 frames per second).

The term "encoded video" as used herein refers to a variety of formats, including, for example, H.264, H.263, MPEG-4, Windows Media Video (WMV), Advanced Video Coding (AVC), Audio Visual Standard (AVS), RealVideo, G.711, G.722 and other suitable formats. The term "encoded video" may also refer to video (in some cases also including audio) that is encoded with a lossy encoding process, or a lossless encoding process. One of the goals of encoding video is to decrease the amount of data needed to represent video images. Video images inherently include redundancies which may be mitigated through various techniques. For example, image compression techniques may be used to reduce the amount of data needed to represent each frame of a video image. In other words, the temporal and spatial correlation found in natural image sequences may be exploited for bit rate reduction. Some frames of the video may be replaced with data that enables reconstruction of the replaced frames with remaining frames. Inter frame coding may use motion compensated regions from already decoded pictures as a prediction signal for the currently coded picture. Video coding standards such as, for example, MPEG-4 and H.264, may specify the coding of motion vectors. Motion vectors may describe the translational displacement of rectangular blocks (forward motion coding) between video frames. The term "motion vector" refers to a two-dimensional vector that identifies an offset of a macroblock, region, or combination thereof, common to separate frames of video, in one of the separate frames relative to the other of the separate frames, the macroblock or region defined by a plurality of pixels. The motion vectors may be part of the frame coding and may be used to determine how much motion objects in the frames are undergoing, such as, for example by determining how many motion vectors are needed to reconstruct a frame.

The term "decoded video" refers to video that has been reconstructed from encoded video. Decoded video may be similar or identical to an unencoded source video used to generate the encoded video from which the decoded video is reconstructed. For example, decoded video may include the same or a different number of pixels per frame as the unencoded source video. Also by way of example, the decoded video may include the same or a different number of frames per second as the unencoded source video.

Figure 1:
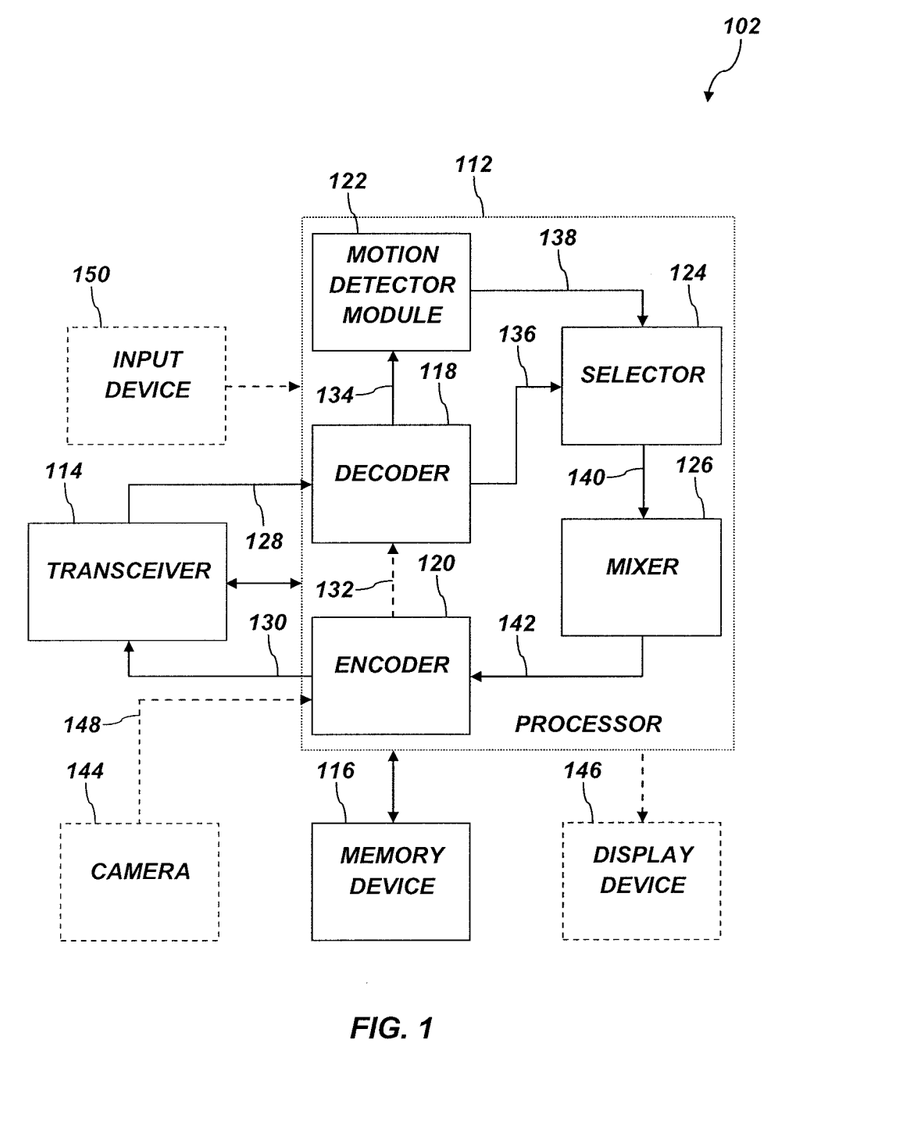
FIG. 1 is a simplified block diagram of a video call host module.

FIG. 1 is a simplified block diagram of a video call host module 102 (referred to hereinafter as "host module 102"). The host module 102 may include a processor 112 operably coupled to a transceiver 114 and a memory device 116. The processor 112 may include a video encoder 120 (referred to hereinafter simply as "encoder 120"), a video decoder 118 (referred to hereinafter simply as "decoder 118"), a motion detector module 122 (may be integrated with the decoder 118 in some embodiments), a selector module 124, and a video mixer 126 (referred to hereinafter simply as "mixer 126"). Although in FIG. 1 the transceiver 114 and the memory device 116 are shown as external to the processor 112, it should be understood that, in some embodiments, one or more of the transceiver 114 and the memory device 116 may be included in the processor 112. Also, in FIG. 1 the encoder 120, the decoder 118, the motion detector module 122, the selector module 124, and the mixer 126 are depicted as part of the processor 112. In some embodiments, the processes performed by these modules may be performed with computing instructions executed by the processor 112. In other embodiments, some or all of these modules may include dedicated hardware for performing the processes. In still other embodiments, one or more of the encoder 120, the decoder 118, the motion detector module 122, the selector module 124, and the mixer 126 may be external to the processor 112. Regardless of their configuration, each of the processor 112, the encoder 120, the decoder 118, the motion detector module 122, the selector module 124, and the mixer 126 may be collectively referred to herein as "a control circuit."

Figure 3:
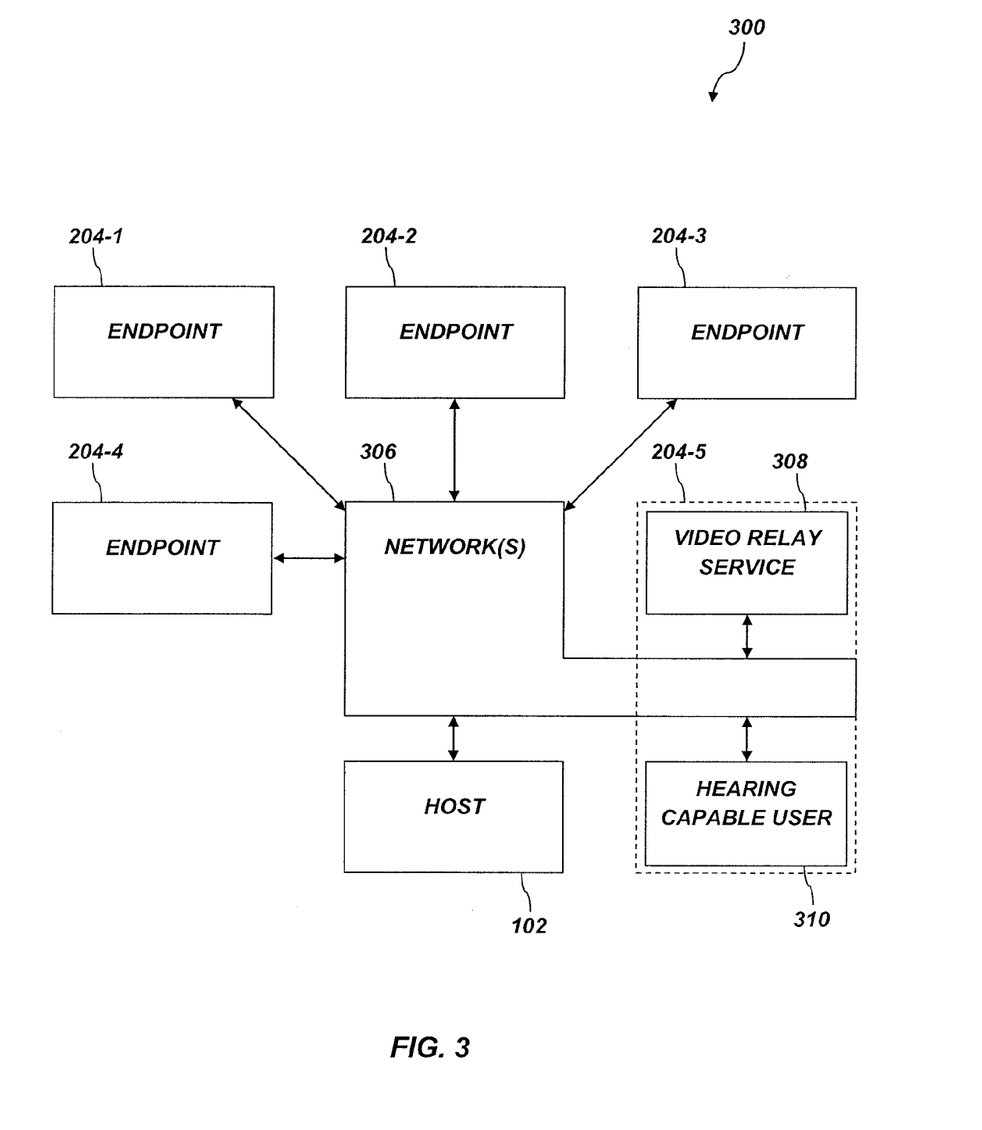
FIG. 3 is a simplified block diagram of a multiple participant video call system.

The processor 112 may be configured to execute commands stored on the memory device 116. By way of non-limiting example, the memory device 116 may include a computer readable media, such as read only memory (ROM), random access memory (RAM), Flash memory, and combinations thereof. The processor 112 may also be configured to control, and send and receive data through the transceiver 114. The transceiver 114 may be configured to send and receive data through one or more networks 306 (FIG. 3).

The decoder 118 may be configured to decode encoded video data 128 received from the transceiver 114 into decoded video data 136. The encoded video data 128 may correspond to a plurality of encoded videos originating at a plurality of endpoints 204 (FIGS. 2 and 3), and the decoded video data 136 may correspond to a plurality of decoded videos, which are generated by decoding the encoded video data 128. The decoder 118 may also be configured to access motion vectors 134 from the encoded video data 128. In addition, the decoder 118 may, in some embodiments, be configured to extract the motion vectors 134 for further processing. Such extraction of motion vectors 134 may be accomplished by modifying a traditional decoder device or algorithm to extract the motion vectors 134. In some embodiments, the decoder 118 may convert the encoded video data 128 to decoded video data 136 that includes the same number of pixels and frames per second as an unencoded video from which the encoded video data 128 was derived. In other embodiments, the decoder 118 may decode the encoded video data 128 to decoded video data 136 that includes one or both of a different number of pixels and a different number of frames per second as the unencoded video from which the encoded video data 128 was derived.

The motion detector module 122 may be configured to calculate a motion indicator 138 for each decoded video from the motion vectors 134 accessed by the decoder 118. By way of non-limiting example, the motion indicator 138 may be calculated based on a number of motion vectors 134 per video frame, a magnitude of the motion vectors 134, a position in the video frame that the motion vectors 134 correspond to, a correlation to predetermined motion vectors, other motion vector 134 features, and combinations thereof. In some embodiments, the decoder 118 may parse and export the motion vectors 134, and the selector module 124 may be configured to count the motion vectors 134. The motion detector module 122 may continuously or periodically calculate the motion indicator 138 from the motion vectors 134. Also, the motion indicator 138 may in some embodiments be, for example, a sum of motion vectors 134 for a frame, an average number of motion vectors 134 per frame, a moving average of the number of motion vectors 134 per frame, a running median of motion vectors 134 per frame, a rate of change of the number of motion vectors 134 per frame, other suitable indicators, and combinations thereof. In some embodiments, traditional motion detection based on video frame analysis may be used to calculate the motion indicator 138 if the decoder 118 is unable to extract the motion vectors 134.

The selector module 124 may be configured to rank each decoded video based on its corresponding motion indicator 138, and selected decoded video data 140 may be passed to the mixer 126. The selected decoded video data 140 may include decoded video data 136 that corresponds to a predetermined number of the highest ranking decoded videos. In some embodiments, the selector module 124 may compare each motion indicator 138 with a predetermined threshold that may typically result from video of a person signing in American Sign Language (ASL). In other embodiments, the selector module 124 may compare each motion indicator 138 with a predetermined threshold that may typically result from video of a person performing a predetermined hand-signal, such as, for example, raising a hand to a top-right corner of a video window. Decoded videos with corresponding motion indicators 138 that are closer to the predetermined threshold may be ranked higher than decoded videos with corresponding motion indicators 138 that are further from the predetermined threshold.

The mixer 126 may be configured to combine each of the decoded videos corresponding to the selected decoded video data 140 into a single unencoded mixed video, corresponding to mixed selected video data 142. The unencoded mixed video may include a sequential series of frames separated into a plurality of segments 454 (FIG. 4), each segment 454 dedicated to one of the decoded videos.

The encoder 120 may be configured to encode the mixed selected video data 142 into encoded mixed video data 130. The encoded mixed video data 130 may be encoded in a variety of formats, including, for example, MPEG-4, Windows Media Video (WMV), Advanced Video Coding (AVC), Audio Visual Standard (AVS), RealVideo, and other suitable formats. The encoded mixed video data 130 may also be encoded with a lossy encoding process, or a lossless encoding process. The processor 112 may cause the transceiver 114 to send the encoded mixed video data 130 to the plurality of endpoints 204 (FIGS. 2 and 3).

The host module 102 may optionally include a camera 144, a display device 146, and an input device 150, similar to a camera 244, a display device 246, and an input device 250, respectively, as will be discussed in more detail with respect to an endpoint 204 of FIG. 2. Inclusion of the camera 144, the display device 146, and the input device 150 in the host module 102 may enable the host module 102 to participate in a video call as an endpoint 204. In order to provide the decoder 118 with encoded local video data 132 and corresponding motion vectors 134, the camera 144 may be operably coupled to the encoder 120. The camera 144 may capture video images, and convert the video images to unencoded local video data 148. The encoder 120 may convert the unencoded local video data 148 to encoded local video data 132, which the decoder 118 may receive and analyze with the encoded video data 128.

Figure 2:
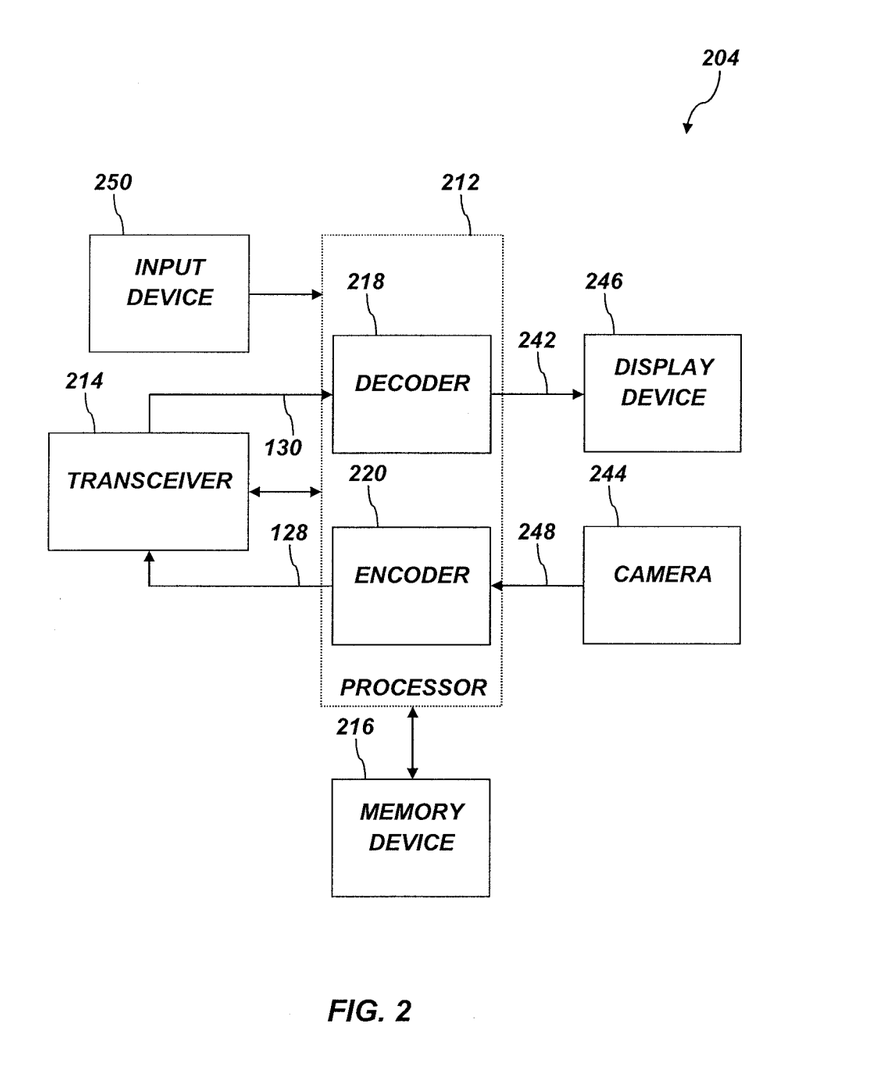
FIG. 2 is a simplified block diagram of an endpoint.

FIG. 2 is a simplified block diagram of an endpoint 204. The endpoint 204 may include a processor 212 operably coupled to a transceiver 214, a memory device 216, an input device 250, a display device 246, and a camera 244. The processor 212 may be configured to execute commands stored on the memory device 216. By way of non-limiting example, the memory device 216 may include a computer readable media, such as read only memory (ROM), random access memory (RAM), Flash memory, and combinations thereof. The processor 212 may include a video decoder 218 (hereinafter referred to as "decoder 218"), and a video encoder 220 (hereinafter referred to as "encoder 220"). The decoder 218 may be configured to convert encoded video data, such as the encoded mixed video data 130 originating at the host module 102, into decoded mixed selected video data 242. The encoder 220 may be configured to convert unencoded video data 248 from the camera 244 to encoded video data 128. In some embodiments, the processes performed by the encoder 220 and decoder 218 may be performed with computing instructions executed on the processor 212. In other embodiments, some or all of these modules may include dedicated hardware for performing the processes. In still other embodiments, one or more of the encoder 220 and the decoder 210, may be external to the processor 212.

The transceiver 214 may be configured to receive the encoded mixed video data 130 and send the encoded video data 128 through one or more networks 306 (FIG. 3) to a host module 102 (FIG. 1).

The camera 244 may include devices capable of capturing video images and converting the video images to data, as will be readily apparent to those skilled in the art. By way of non-limiting example, the camera 244 may include a webcam, a camcorder device, a camera device integrated into the same enclosure as the processor 112, or other suitable devices. The camera 244 may be configured to deliver unencoded video data 248 to the processor 212.

Figure 4:
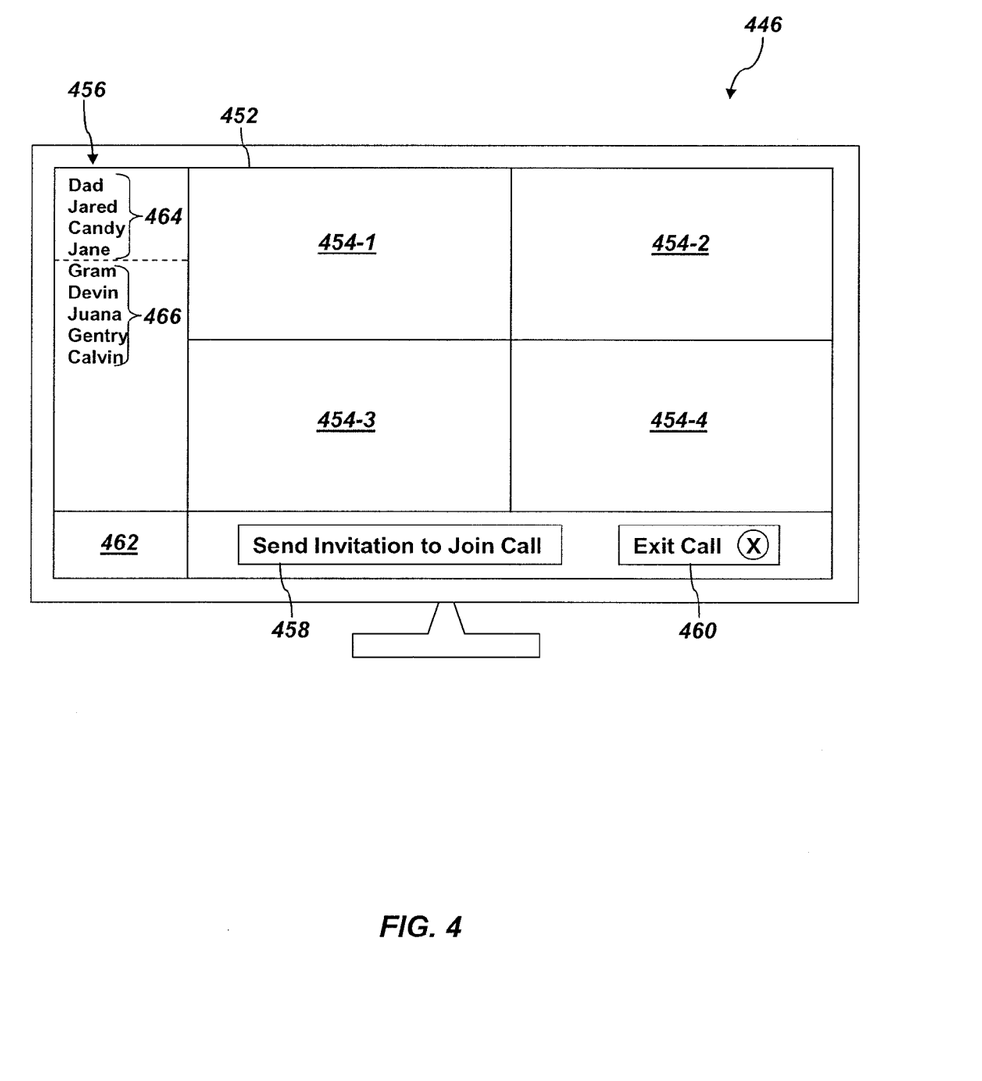
FIG. 4 is a simplified front view of a display device of an endpoint.

The display device 246 may be any device capable of receiving video data, such as the decoded mixed selected video data 242, and displaying video images corresponding to the video data. By way of non-limiting example, the display device 246 may be any of a light-emitting diode (LED) array, a liquid crystal display (LCD), a cathode ray tube (CRT) display, a plasma display, a projector, and combinations thereof. In some embodiments, the display device 246 may be external to an enclosure that houses the processor 212. In other embodiments, the display device 246 may reside in the same enclosure as the processor 212, such as, for example, in a smart phone or a tablet computer. The display device 246 may also be configured to present one or more options to a user of the endpoint 204. By way of non-limiting example, the display device 246 may present a send invitation to join call option 458, and an exit call option 460 (FIG. 4).

The input device 250 may be configured to enable the user of the endpoint 204 to control some functions of the endpoint 204. The input device 250 may also be configured to enable the user to select the one or more options presented by the display device 246. By way of non-limiting example, the input device 250 may include a keyboard, a numerical keypad, a mouse, a touch-screen, a button array, a track pad, a remote control, motion sensors, haptic sensors, orientation sensors, position sensors, a microphone, and combinations thereof.

Although the endpoint 204 is described herein with particular emphasis on hearing impaired video calls, the endpoint 204 and host module 102 (FIG. 1) may also be configured to enable video calls between hearing-capable users. As such, the endpoint 204 may include a speaker (not shown) for playing audio corresponding to the video being displayed on the display device 246, and a microphone for converting sounds corresponding to a verbal conversation to data. The processor 212 may, consequently, be configured to cause the transceiver 214 to send and receive audio data corresponding to the encoded video data 128 and the encoded mixed video data 130.

FIG. 3 is a simplified block diagram of an example of a multiple-participant video call system 300. The multiple-participant video call system 300 of FIG. 3 includes a plurality of endpoints 204-1, 204-2, 204-3, 204-4, 204-5 (referred to generally together as "endpoints 204," and individually as "endpoint 204") and a host module 102 configured to communicate with each other through one or more networks 306.

Some endpoints 204, such as endpoint 204-5 of FIG. 3, may be configured for intervention from a video relay service 308, which may provide sign language translation to a user, such as a hearing-capable user 310, participating in a video call with other users communicating in sign language. By way of non-limiting example, the hearing-capable user 310 may utilize a standard telephone to communicate with the video relay service 308 through the networks 306, and the video relay service 308 may send encoded video of a person serving as a translator signing a translation of the words spoken by the hearing-capable user 310 to the host module 102 through the one or more networks 306.

The one or more networks 306 (also referred to herein as "networks 306") may include an internet protocol (IP) network configured to transmit communications between the endpoints 204 and the host module 102. The networks 306 may also include other networks, such as, for example, public switched telephone networks (PSTNs). Although relatively low data rates associated with PSTNs are generally not ideal for transmitting video data, PSTNs may be adequate to transmit audio data between a conventional telephone and a video relay service 308. The networks 306 may include a wide area network (WAN), a local area network (LAN), a personal area network (PAN), and combinations thereof. In some embodiments, the networks 306 may include a cloud network. The networks 306 may be configured to communicate with the endpoints 204 and the host module 102 wirelessly, through a cable, and combinations thereof. Some non-limiting examples of suitable wireless communications may include "WiFi," Bluetooth, and mobile wireless networks. Some non-limiting examples of suitable cables include fiber-optic cables, coaxial cables, traditional telephone cables, and Ethernet cables.

Referring now to FIGS. 1 through 3, in operation, each endpoint 204 may capture a video of a person participating in a video call hosted by the host module 102, and convert the video to unencoded video data 248. The endpoints 204 may convert the unencoded video data 248 into encoded video data 128, and send the encoded video data 128 to the host module 102. The host module 102 may receive the encoded video data 128 from each of the endpoints 204, and utilize motion vectors 134 from the encoded video data 128 to determine a motion indicator 138 corresponding to each of the endpoints 204. The host module 102 may rank the videos from each of the endpoints 204 based on the corresponding motion indicators 138. The host module 102 may convert at least the encoded video data 128 corresponding to a predetermined number of highest-ranking videos to decoded video data 136. The host module 102 may combine the decoded video data 136 corresponding to the predetermined number of highest-ranking videos into a single mixed video with corresponding mixed selected video data 142. The host module 102 may convert the mixed selected video data 142 into encoded mixed video data 130, and send the encoded mixed video data 130 to the endpoints 204. The endpoints 204 may display video corresponding to the encoded mixed video data 130 to users of the endpoints 204.

The ranking of the various videos may include other parameters. As a non-limiting example, one or more of the participants may be defined as to be always presented (e.g., a participant who is hosting the video call, a supervisor, a person designated to direct the conversation, etc.) and will, therefore, be ranked highest regardless of the motion indicator 138 for the video stream. As another non-limiting example, a video stream that is presently being displayed may include a higher priority relative to a video stream that is not presently being displayed. In this way, a non-displayed video stream may need to have a relatively higher motion indicator 138 than a displayed video stream in order to be presented and knock out one of the displayed video streams. The users of the endpoints 204 may see the users of the endpoints 204 that correspond to the predetermined number of highest-ranking videos on the display devices 246. As the users perform acts that cause the rankings of the videos to change over time, different users of the endpoints 204 may be displayed at different times. By way of non-limiting example, at any given time the predetermined number of highest-ranking videos may correspond to the endpoints 204 whose users most recently signed in American Sign Language. Also by way of non-limiting example, at any given time the predetermined number of highest-ranking videos may correspond to the endpoints 204 whose users are performing the greatest amount of motion. Consequently, the number of participants in a video call may exceed a number of segments 454 on a screen 452 (FIG. 4) of a display device 246.

In some embodiments, the host module 102 may send different encoded mixed video data 130 to different endpoints 204. By way of non-limiting example, the host module 102 may exclude a first video corresponding to a first endpoint 204-1 when ranking videos to be included in a first mixed video to be sent to the first endpoint 204-1. Consequently, the first endpoint 204-1 may only receive encoded mixed video data 130 including videos originating at other endpoints 204. Limiting the encoded mixed video data 130 sent to the first endpoint 204-1 in this way may be advantageous as a user of the first endpoint 204-1 may prefer to dedicate the limited number of videos included in the encoded mixed video data 130 received at the first endpoint 204-1 to videos originating at other endpoints 204. Furthermore, the first endpoint 204-1 may already access the video that originates at the first endpoint, therefore receiving the video that originates at the first endpoint 204-1 as part of the encoded mixed video data 130 is redundant. Such embodiments may require a significant amount of processing power as the processor 112 (FIG. 1) would be required to mix and encode a separate mixed video for each endpoint participating in a video call. A central server with relatively high network 306 bandwidth and processing power may optionally be used as the host module 102 to provide the needed bandwidth for the network 306 and encoder 120.

In some embodiments, each endpoint 204 may receive the same encoded mixed video data 130 corresponding to the same predetermined number of highest ranking videos. In such embodiments, less network 306 bandwidth and processing power may be required. If the host module 102 is itself an endpoint with limited network 306 bandwidth and processing power, such embodiments may be preferred.

In still other embodiments the multiple participant video call system may be configured as a distributed multiple control unit (MCU). In such embodiments, the processor 212 (FIG. 2) of each endpoint 204 may be configured to perform similar functions to those of the processor 112 (FIG. 1) of the host module 102. By way of non-limiting example, each endpoint 204 may be configured to receive encoded video data 128 from the other endpoints 204, rank the corresponding videos based on a motion indicator 138 calculated from the motion vectors 134 of each video, select a predetermined number of the highest ranking videos based on the motion indicator 138, generate a mixed video including the predetermined number of highest ranking videos, and cause the display device 246 to display the mixed video. In such embodiments, each endpoint 204 would require a sufficiently powerful processor 212 to decode the encoded video data 128 from the other endpoints 204, and a sufficient communication bandwidth to the networks 306 to receive the encoded video data 128 from each of the other endpoints 204.

In further embodiments, each endpoint 204 may utilize the motion vectors 134 from the encoded video data 128 it generates to determine the corresponding motion indicator 138. The endpoints 204 may send the motion indicators 138 to the host module 102, which may rank the videos and select the predetermined number of highest-ranking videos. The host module 102 may cause the endpoints 204 corresponding to the predetermined number of highest-ranking videos to send encoded video data 128 to the host module 102. The host module 102 may decode, mix, and re-encode the predetermined number of highest-ranking videos, and send the resulting encoded mixed video data 130 to the endpoints. Such embodiments may reduce the amount of network 306 bandwidth and the processing power of the host module 102 needed to operate the multiple-participant video call system 300.

FIG. 4 is a simplified front view of a display device 446 of an endpoint 204. The display device 446 may include a screen 452 configured to display the predetermined number of highest-ranking videos corresponding to the decoded mixed selected video data 242 (FIG. 2). The screen 452 may be configured to display the plurality of videos in a plurality of segments 454-1, 454-2, 454-3, 454-4 (referred to generally together as "segments 454" and individually as "segment 454") of the screen 452. Each segment 454 may be configured to display one of the predetermined number of highest-ranking videos selected by the selector module 124 of the host module 102 (FIG. 1).

In some embodiments, the screen 452 may also be configured to display a list 456 of the participants that are participating in a video call. The screen 452 may indicate which participants from the list 456 are currently displayed participants 464, and which participants from the list 456 are not currently displayed participants 468. On the screen 452 of FIG. 4, for example, the currently displayed participants 464 are grouped together, and separated from the not currently displayed participants 468 by a dashed line. In other embodiments, text such as "on screen" may be placed next to the currently displayed participants 468. In still other embodiments any of highlights, color coded text, icons, other indicators, and combinations thereof, may be used to indicate which participants from the list 456 are currently displayed participants 464.

The screen 452 may also be configured to present a send invitation to join call option 458 and an exit call option 460. A user may select the send invitation to join call option 458 or the exit call option 450 by using the input device 250 of the endpoint 204 (FIG. 2).

The screen 452 may optionally be configured to display a thumbnail 462 of the local user's own video. The thumbnail 462 may assist the user in positioning his or her self in a suitable location relative to the camera 244 of the endpoint 204. The thumbnail 462 may also enable the user to perform some act that may move the user's video up in the rankings, such as, for example, placing a hand in the top right corner of the video.

Figure 5:
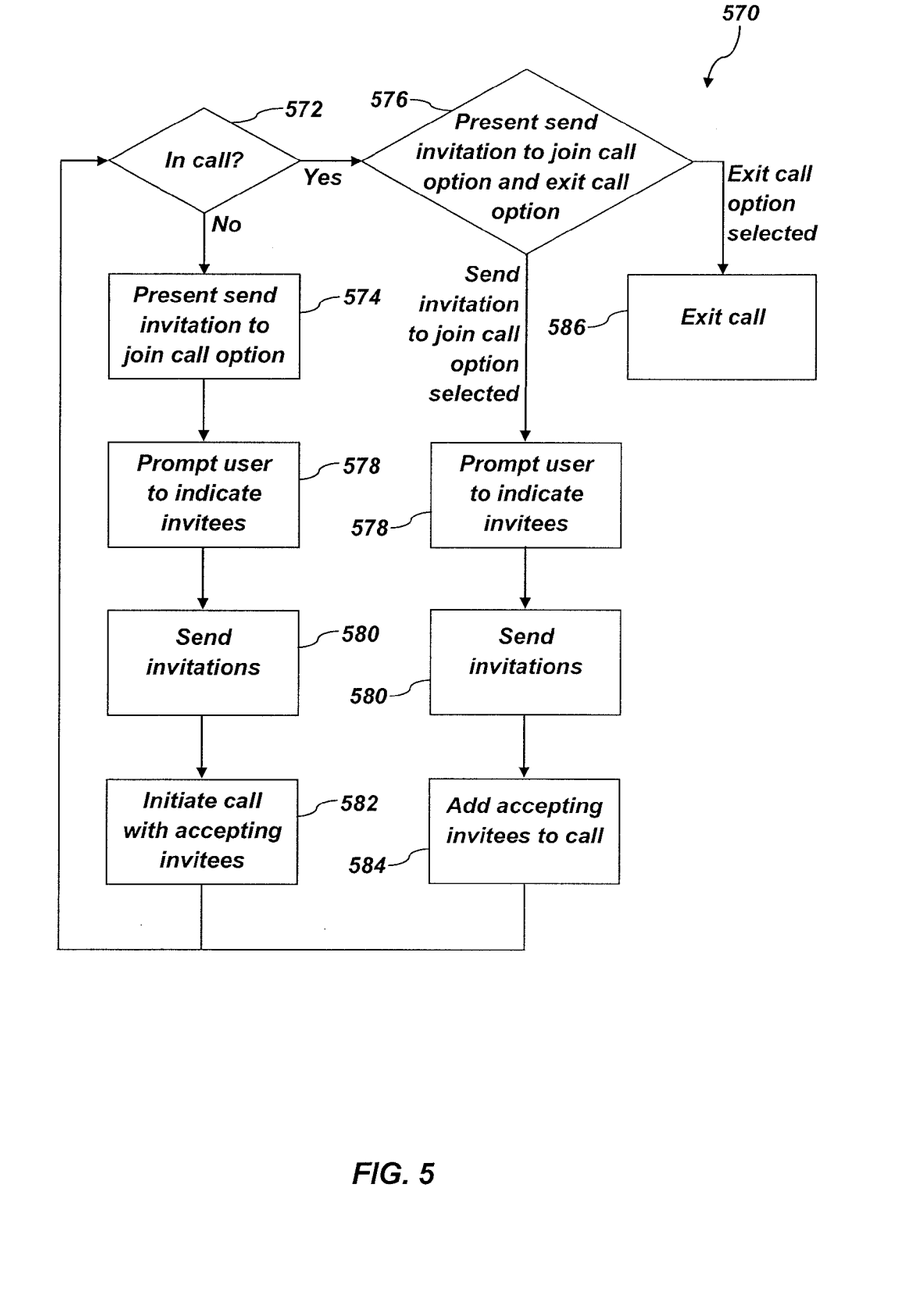
FIG. 5 is a simplified flowchart of a method of initiating and participating in a video call at an endpoint with a plurality of other endpoints.

FIG. 5 is a simplified flowchart 570 of a method of initiating and participating in a video call at an endpoint 204 with a plurality of other endpoints 204 (FIGS. 2 and 3). Referring to FIGS. 1 through 5, the method may include determining whether the endpoint 204 is currently participating in a video call. If the endpoint 204 is not currently participating in a video call, a screen 452 of the endpoint 204 may present a send invitation to join call option 458 to a user of the endpoint 204 at operation 574. A user may select the send invitation to join call option 458 by using the input device 250.

If the user of the endpoint 204 selects the send invitation to join call option 458, the endpoint 204 may cause the screen 452 to prompt the user to indicate one or more of the plurality of other endpoints 204 that the user desires to invite to join the video call at operation 578. In some embodiments, the screen 452 may display a list of contacts stored on the memory device 216, and the user may utilize the input device 250 to select the contacts that the user desires to invite to join the video call. In other embodiments, the processor 212 may cause the endpoint 204 to prompt the user for one or more unique identifiers corresponding to the plurality of other endpoints 204 that the user desires to invite to join the video call, such as, for example, internet protocol (IP) addresses, usernames associated with IP addresses on a server, a directory stored on a memory device 116 of a host module 102 or a server, and combinations thereof.

At operation 580, one of the endpoint 204 and the host module 102, or both, if integrated together, may send invitations to the one or more of the plurality of other endpoints 204 that the user indicated at operation 578. In some embodiments, the processors 212 of the other endpoints 204 may cause the screens 452 of the other endpoints 204 to indicate the invitation to join the video call, and prompt the users of the other endpoints 204 to accept or reject the invitation to join the video call. The users of the other endpoints 204 may use the input devices 250 of the other endpoints 204 to indicate their acceptance or rejection of the invitation to join the video call.

At operation 582, the host module 102 may initiate a video call with the other endpoints 204 whose users accepted the invitation to join the video call. During the video call, video is captured, encoded, decoded, displayed, and exchanged between the endpoints 204 and the host module 102. Greater detail regarding the capture, encoding, decoding, displaying, and exchanging of video during the video call is discussed with respect to FIG. 6.

Returning to operation 572, if the endpoint 204 is currently participating in a video call, the screen 452 of the endpoint 204 may present the send invitation to join call option 458 and an exit call option 460 to the user at operation 576. If the user selects the send invitation to join call option 458, the screen 452 may prompt the user to indicate one or more of the plurality of other endpoints 204 that the user desires to invite to join the video call at operation 578, and one of the endpoint 204 and the host module 102 may send invitations to the one or more indicated endpoints 204 at operation 580, as previously discussed. At operation 584, the host module 102 may add accepting invitees to the video call.

Returning to operation 576, if the user selects the exit call option 460, the endpoint 204 may exit from participating in the video call at operation 586. The endpoint 204 may stop sending data to and receiving data from the other endpoints 204.

Figure 6:
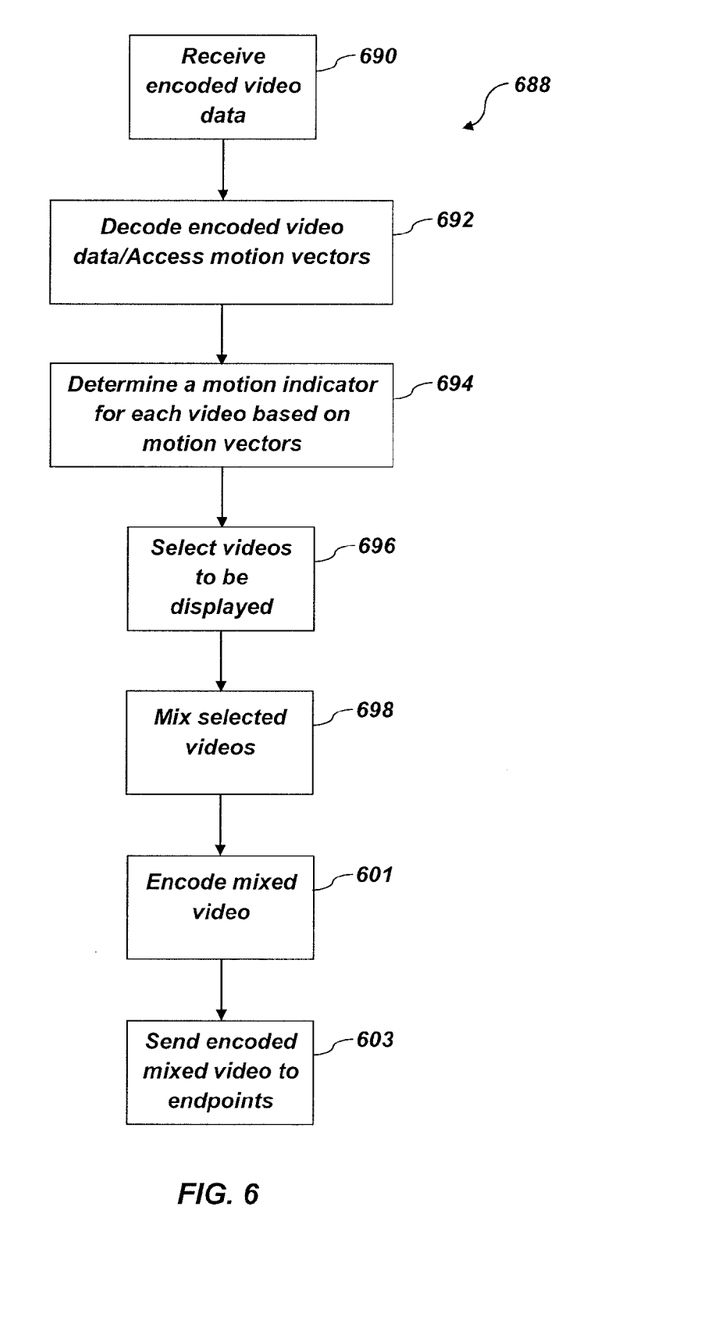
FIG. 6 is a simplified flowchart of a method of managing video data in a video call between multiple endpoints.

FIG. 6 is a simplified flowchart 688 of a method of managing video data in a video call between multiple endpoints 204 (FIGS. 2 and 3). Referring to FIGS. 1 through 4 and 6, the method may include receiving encoded video data 128 at a host module 102 at operation 690. The encoded video data 128 may originate at each of a plurality of endpoints 204, and may correspond to encoded videos originating at each of the endpoints 204. The method may include converting the encoded video data 128 to decoded video data 136 and accessing motion vectors 134 from the encoded video data 128 at operation 692.

The method may also include utilizing the motion vectors 134 to determine a motion indicator 138 for each of the decoded videos corresponding to the decoded video data 136 at operation 694. By way of non-limiting example, determining the motion indicator 138 may be based on a number of motion vectors 134 per video frame, a magnitude of the motion vectors 134, a position in the video frame that the motion vectors 134 correspond to, a correlation to predetermined motion vectors, other motion vector 134 features, and combinations thereof.

In some embodiments, the decoder 118 may extract the motion vectors 134 from the encoded video data 128 at operation 692. In such embodiments, the decoder 118 may continuously decode all of the encoded video data 128 received from all the endpoints 204 in order to monitor the motion vectors 134. In other embodiments, the endpoints 204 may each extract the motion vectors 134 from their corresponding encoded video data 128 at encoding, and the host module 102 may receive the motion vectors 134 with the encoded video data 128 at operation 690. In such embodiments, the decoder 118 may only decode the encoded video data 128 corresponding to videos that will be selected for display, as discussed more fully with respect to operation 696. Limiting the amount of encoded video data 128 that the decoder 118 decodes may decrease a total decoder 118 bandwidth needed to operate the host module 102. Decoder 118 bandwidth may, in some instances, be a limiting design constraint. Consequently, in situations where the host module 102 includes a relatively limited decoder 118, extraction of the motion vectors 134 during encoding at the endpoints 204 may be advantageous.

Once motion indicators 138 have been determined, the method may include selecting from the decoded videos for videos that will be displayed at the endpoints 204. Selecting from the decoded videos for videos that will be displayed at the endpoints 204 may include ranking the videos based on the motion indicators 138 that have been assigned thereto. By way of non-limiting example, if the display devices 246 of the endpoints 204 are configured to display four videos at a time, then the four highest ranking streams may be selected for display.

At operation 698, the host module 102 may mix the selected videos together into a single video corresponding to mixed selected video data 142. At operation 601, the mixed selected video data 142 may be converted to encoded mixed video data 130. The host module 102 may send the encoded mixed video to the endpoints 204 at operation 603.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video call host module, comprising:
a transceiver configured to communicate with a plurality of endpoints through one or more networks; and
a processor operably coupled to the transceiver, the processor including:
a decoder configured to convert encoded video data received by the transceiver from the plurality of endpoints to decoded video data, the encoded video data corresponding to a plurality of videos and comprising a plurality of motion vectors;
a selector configured to rank the plurality of videos responsive to a motion indicator calculated from the plurality of motion vectors for each of the plurality of videos, and select a predetermined number of highest ranking videos for display at the endpoints; and
a video mixer configured to utilize the decoded video data to generate a mixed video comprising the predetermined number of highest ranking videos.

2. The video call host module of claim 1, wherein the processor further includes a motion detector module configured to utilize the motion vectors to calculate the motion indicator corresponding to each of the plurality of videos.

3. The video call host module of claim 1, wherein the motion indicator calculated from the plurality of motion vectors is determined from a feature selected from the group consisting of a number of motion vectors per video frame, a magnitude of the motion vectors, a position in the video frame that the motion vectors correspond to, and a correlation to one or more predetermined motion vectors.

4. The video call host module of claim 1, wherein the selector is configured to rank a first video of the plurality of videos with a corresponding first motion indicator higher than a second video of the plurality of videos with a corresponding second motion indicator if the first motion indicator is closer to a predetermined threshold than the second motion indicator.

5. The video call host module of claim 4, wherein the predetermined motion indicator is a motion indicator that is expected to correspond to a video of a person signing in American Sign Language, or a video of a person performing a predetermined sign.

6. The video call host module of claim 1, wherein the transceiver is configured to receive each motion indicator corresponding to each of the plurality of videos from the plurality of endpoints.

7. The video call host module of claim 6, wherein the decoder is further configured to decode only the encoded video data that corresponds to the predetermined number of highest ranking videos.

8. The video call host module of claim 6, wherein the processor is configured to cause only the endpoints corresponding to the predetermined number of highest ranking videos to send encoded video data to the video call host module.

9. The video call host module of claim 1, wherein the processor further comprises an encoder configured to encode the video including the predetermined number of highest ranking videos.

10. A method of hosting a video call, the method comprising:
receiving encoded video data including a plurality of motion vectors and corresponding to a plurality of videos from a plurality of endpoints participating in a video call at a transceiver of a video call host module;
utilizing a processor of the video call host module to rank the plurality of videos responsive to a motion indicator calculated from the motion vectors for each of the plurality of videos, and to select a predetermined number of highest ranking videos of the plurality of videos for display;
utilizing a decoder to decode at least the encoded video data that corresponds to the predetermined number of the plurality of videos;
generating mixed video data corresponding to a mixed video comprising the predetermined number of the plurality of videos;
utilizing an encoder to convert the mixed video data into encoded mixed video data; and
sending the encoded mixed video data from the transceiver to the plurality of endpoints.

11. The method of claim 10, further comprising utilizing the processor to cause each of the plurality of endpoints participating in the video call to decode the encoded mixed video data and display the corresponding mixed video including the predetermined number of the plurality of videos on a display device.

12. The method of claim 11, wherein utilizing the processor to cause each of the plurality of endpoints to display the video including the predetermined number of the plurality of videos on the display device comprises causing each of the predetermined number of the plurality of videos to be displayed in a different segment of a screen of the display device.

13. The method of claim 10, wherein the predetermined number of the plurality of videos is a number selected from the group of integers in the range from one to twenty.

14. The method of claim 10, further comprising:
causing each of the plurality of endpoints participating in the video call to present a send invitation to join call option;
causing each of the plurality of endpoints to prompt a user to indicate one or more other endpoints to invite to join the video call responsive to the user selecting the send invitation to join call option;
sending invitations to join the video call to the one or more other endpoints indicated by the user; and
adding the one or more other endpoints that accept the invitations to join the video call to the video call.

15. The method of claim 10, further comprising causing each of the plurality of endpoints participating in the video call to present an exit call option, and removing a first endpoint of the plurality of endpoints from participation in the video call responsive to a user of the first endpoint selecting the exit call option.

16. A video call host module, comprising:
a control circuit configured to:
decode video data corresponding to a plurality of videos from a plurality of endpoints;
rank the plurality of videos responsive to a plurality of motion indicators, each motion indicator of the plurality of motion indicators corresponding to one of the plurality of videos, and each of the plurality of motion indicators calculated from one or more motion vectors of the one of the plurality of videos; and
select a predetermined number of highest-ranking videos for display.

17. The video call host module of claim 16, further comprising a first endpoint of the plurality of endpoints, the first endpoint comprising a processor, a camera, a display device, and an input device, wherein the first endpoint is configured to participate in a video call.

18. The video call host module of claim 17, wherein the display device comprises a screen configured to display the predetermined number of highest-ranking videos in a plurality of segments of the screen.

19. The video call host module of claim 17, wherein the first endpoint is configured to participate in the video call with others of the plurality of endpoints in a distributed multipoint control unit (MCU) system, each other endpoint configured to decode video data, rank the plurality of videos based on a motion indicator calculated from the one or more motion vectors corresponding to each of the plurality of videos, and select a predetermined number of the highest-ranking videos for display.

20. The video call host module of claim 16, further comprising a server device comprising the control circuit, the server device configured to host a video call.

21. A method of hosting a video call, the method comprising:
ranking a plurality of videos generated at a plurality of endpoints participating in a video call with a control circuit responsive to a motion indicator calculated from motion vectors corresponding to each of the plurality of videos;
utilizing the control circuit to select a predetermined number of highest ranking videos of the plurality of videos;
receiving encoded video data at a transceiver operably coupled to the control circuit, the encoded video data corresponding to at least the predetermined number of highest ranking videos;
decoding at least the encoded video data that corresponds to the predetermined number of highest ranking videos with the control circuit; and
utilizing the control circuit to generate mixed video data corresponding to a mixed video comprising the predetermined number of the plurality of videos.

22. The method of claim 21, further comprising encoding the mixed video data with the control circuit and utilizing the transceiver to send the encoded mixed video data to the plurality of endpoints participating in the video call.

23. The method of claim 21, further comprising receiving the motion indicator corresponding to each of the plurality of videos at the transceiver.

24. The method of claim 21, further comprising receiving the motion vectors from the plurality of endpoints at the transceiver and utilizing the control circuit to determine the motion indicator corresponding to each of the plurality of videos from the corresponding motion vectors.

25. The method of claim 21, further comprising
receiving encoded video data from each of the plurality of endpoints at the transceiver, the encoded video data comprising the motion vectors; and
utilizing the control circuit to determine the motion indicator corresponding to each of the plurality of videos from the corresponding motion vectors.

\* \* \* \* \*